(12) United States Patent
Hoffman

(10) Patent No.: US 6,370,559 B1
(45) Date of Patent: Apr. 9, 2002

(54) **METHOD AND APPARATUS FOR PERFORMING N BIT BY 2*N−1 BIT SIGNED MULTIPLICATIONS**

(75) Inventor: Nathaniel Hoffman, Haifa (IL)

(73) Assignee: Intel Corportion, Santa Clara, CA (US)

( * ) Notice: Subject to any disclaimer, the term of this patent is extended or adjusted under 35 U.S.C. 154(b) by 0 days.

(21) Appl. No.: 09/354,004

(22) Filed: Jul. 13, 1999

Related U.S. Application Data

(62) Division of application No. 08/822,846, filed on Mar. 24, 1997, now Pat. No. 6,014,684.

(51) Int. Cl.[7] ............................................. G06F 7/52
(52) U.S. Cl. ..................................................... 708/625
(58) Field of Search .................................. 708/620, 625

(56) References Cited

U.S. PATENT DOCUMENTS

| | | | |
|---|---|---|---|
| 3,711,692 A | 1/1973 | Batcher ...................... | 235/175 |
| 3,723,715 A | 3/1973 | Chen et al. ................. | 235/175 |
| 4,161,784 A | 7/1979 | Cushing et al. ............. | 364/748 |
| 4,393,468 A | 7/1983 | New .......................... | 364/736 |
| 4,418,383 A | 11/1983 | Doyle et al. ................ | 364/200 |
| 4,498,177 A | 2/1985 | Larson ....................... | 371/52 |
| 4,707,800 A | 11/1987 | Montrone et al. .......... | 364/788 |
| 4,771,379 A | 9/1988 | Ando et al. ................. | 364/200 |
| 4,989,168 A | 1/1991 | Kuroda et al. ......... | 364/715.09 |
| 5,095,457 A | 3/1992 | Jeong ......................... | 364/758 |
| 5,187,679 A | 2/1993 | Vassiliadis et al. ......... | 364/786 |
| 5,586,070 A | * 12/1996 | Purcell ....................... | 708/625 |
| 5,751,622 A | * 5/1998 | Purcell ....................... | 708/625 |
| 5,764,558 A | * 6/1998 | Pearson et al. ............. | 708/625 |
| 5,880,985 A | 3/1999 | Makineni et al. | |

OTHER PUBLICATIONS

Chevillat et al, "Pipelined Hardware Multiplier With Extended Precision", IBM Tech. Discl. Bull. vol. 23, No. 9 Feb. 1981, pp. 4322–4323.*
J. Shipnes, *Graphics Processing with the 88110 RISC Microprocessor*, IEEE (1992), pp. 169–174.
*MC88110 Second Generation RISC Microprocessor User's Manual*, Motorola Inc. (1991).
*Errata to MC88110 Second Generation RISC Microprocessor User's Manual*, Motorola Inc. (1992), pp. 1–11.
*MC88110 Programmer's Reference Guide*, Motorola Inc. (1992), p 1–4.
*i860™ Microprocessor Family Programmer's Reference Manual*, Intel Corporation (1992), Ch. 1, 3, 8, 12.
R. B. Lee, *Accelerating Multimedia With Enhanced Microprocessors*, IEEE Micro (Apr. 1995), pp. 22–32.
*TMS320C2x User's Guide*, Texas Instruments (1993) pp. 3–2 through 3–11; 3–28 through 3–34; 4–1 through 4–22; 4–41; 4–103; 4–119 through 4–120; 4–122; 4–150 through 4–151.

(List continued on next page.)

Primary Examiner—Tan V. Mai
(74) Attorney, Agent, or Firm—Blakely, Sokoloff, Taylor & Zafman LLP

(57) ABSTRACT

A method and apparatus for performing N bit by 2*N (or 2*N−1) bit signed multiplication using two N bit multiply instructions. According to one aspect of the invention, a method for performing signed multiplication of A times B (where B has N bits and A has N*2 bits) is described. In this method, $A_{high}$ and $A_{low}$ respectively represent the most and least significant halves of A. According to this method, $A_{low}$ is logically shifted right by one bit to generate $A_{low} \gg 1$. Then, $A_{low} \gg 1$ is multiplied by B using signed multiplication to generate a first partial result. In addition, a second partial result is generated by performing signed multiplication of $A_{high}$ times B. One or both of the first and second partial results is shifted to align the first and second partial results for addition, and then the addition is performed to generate a final result representing A multiplied by B.

14 Claims, 13 Drawing Sheets

OTHER PUBLICATIONS

L. Gwennap, *New PA–RISC Processor Decodes MPEG Video*, Microprocessor Report (Jan. 1994), pp. 16, 17.

SPARC Technology Business, *UltraSPARC Multimedia Capabilities On–Chip Support for Real–Time Video and Advanced Graphics*, Sun Microsystems (Sep. 1994).

Y. Kawakami et al., *LSI Applications: A Single–Chip Digital Signal Processor for Voiceband Applications*, Solid State Circuits Conference, Digest of Technical Papers; IEEE International (1980).

B. Case, *Philips Hopes to Displace DSPs with VLIW*, Microprocessor Report (Dec. 1994) pp. 12–15.

L. Gwennap, *UltraSparc Adds Multimedia Instructions*, Microprocessor Report (Dec. 1994), pp. 16–18.

N. Margulis, *i860 Microprocessor Architecture*, McGraw Hill, Inc. (1990) Ch. 6, 7, 8, 10, 11.

*Pentium Processor User's Manual, vol. 3: Architecture and Programming Manual*, Intel Corporation (1993), Ch. 1, 3, 4, 6, 8, and 18.

*Intel Architecture MMX™ Technology Programmer's Reference Manual*, Legal Stuff ©1997 Intel Corporation (Mar. 1996).

*MMX™ Technology Developers Guide*, Legal Stuff ©1997 Intel Corporation.

*MMX™ Technology Technical Overview*, 1996 Intel Corporation.

Foley, van Dam, Feiner and Hughes, *Computer Graphics— Principles and Practice* (1996), Addison–Wesley Publishing Co., Inc., pp. 213–217.

*MMX™ Technology Application Note*, "Using MMX Instructions to Perform 16–Bit × 31–Bit Multiplication", 1996 Intel Corporation, 6 pages.

*MMX™ Technology Application Note*, "Using MMX Instructions to Perform 3D Geometry Transformations", 1996 Intel Corporation, 20 pages.

\* cited by examiner

METHOD AND APPARATUS FOR PERFORMING N BIT BY 2*N−1 BIT SIGNED MULTIPLICATIONS

This is a divisional of application Ser. No. 08/822,846, filed on Mar. 24, 1997 U.S. Pat. No. 6,014,684.

BACKGROUND OF THE INVENTION

1. Field of the Invention

The invention relates to the field of computer systems. More specifically, the invention relates to software for performing multiplication operations.

2. Background information

Since numerous routines executed on processors require multiplication, processors typically are capable of executing an instruction to multiply together one or more operands. Unfortunately, certain routines require a higher-precision multiply (e.g., a 16 bit by 32 bit multiply) than is supported by the multiply instruction(s) of a processor. When no single multiply instruction can perform the higher-precision multiply, different combinations of instructions must be used.

Binary numbers are typically used either to represent unsigned numbers or signed numbers using 2's complement signed representation. The multiplication operation is performed in a different fashion for signed and unsigned numbers.

The full result of a N bit by N bit multiplication requires 2*N bits to represent. A 'full-multiply' instruction is one which multiplies two N bit numbers and yields the full 2*N bit result. Processors that lack such a multiply instruction use two instructions: 1) a 'multiply-high' instruction which produces the upper N bits of the result; and 2) a 'multiply-low' instruction which produces the lower N bits. Additional instructions are used to combine the two halves if necessary.

The full result of a 2*N bit by N bit multiplication requires 3*N bits to represent, however in many cases not all the bits of the result are needed. A smaller range out of the 3*N bit result is often used, most typically 2*N bits. If the multiplicands and result represent integers, the lower 2*N bits will be used (in this case an error may occur if the result does not fall into the range which can be represented by 2*N bits). If the multiplicands and/or result represent fixed-point numbers, some other range of 2*N bits out of the 3*N bit result will be used, depending on the radix point locations. Table 1 illustrates the selection of 2*N bits out of a 3*N bit result. In Table 1, 'K' and 'N−K' respectively represent the number of unused upper and lower bits, while the 2*N bits from the N−K+1 bit to the 3*N−K bit are used. K may range from 0 to N.

TABLE 1

| 3*N Bit Result | | |
| --- | --- | --- |
| K Bits | 2*N Bits Used | N−K Bits |

FIG. 1 is a data flow diagram illustrating a method of using two N bit by N bit multiply operations to perform an N bit by 2*N bit unsigned multiplication. Although the complete result of such a multiplication is 3*N bits long, typically only part of the 3*N bit result is used in further computations (e.g., 2*N bits are used out of the full 3*N bit result as illustrated in Table 1). In FIG. 1, rectangles are used to illustrate data and ovals are used to illustrate operations. FIG. 1 shows a value A represented in 2*N bits and a value B represented in N bits. The value A is divided into a most significant half ($A_{HIGH}$) and a least significant half ($A_{LOW}$).

In step 110, $A_{HIGH}$ is multiplied by B using unsigned multiplication to generate $B*A_{HIGH}$. In step 120, $A_{LOW}$ is multiplied by B using unsigned multiplication to generate $B*A_{LOW}$. Note that both steps 110 and 120 perform a full N bit multiplication which multiplies two N bit numbers to produce a 2*N bit result. On processors which do not have a full multiply but have multiply-high and multiply-low instructions, steps 110 and 120 will be performed by either: 1) using multiple instructions; or 2) using multiply-high/low instructions that perform 2*N bit by 2*N bit multiplications.

Aligning the least significant bit position of $B*A_{HIGH}$ with the (N+1) least significant bit position of $B*A_{LOW}$ and then performing an addition operation yields $B*A$. The shifting in steps 130 and 140 illustrate one way of properly aligning the values for the addition operation (step 150) that generates a value representing $B*A$. In step 130, $B*A_{HIGH}$ is logically shifted left K bits to generate $K<<(B*A_{HIGH})$. While in step 140, the $B*A_{LOW}$ is arithmetically shifted right (N−K) bits to generate $(B*A_{LOW})>>(N-K)$. It is worthwhile to note that the shifting of $B*A_{LOW}$ to the right allows for the use of a 2*N bit addition.

While FIG. 1 illustrates a method for performing unsigned multiplications, often times signed multiplications are required. However, the method of FIG. 1 cannot be used to perform signed multiplications

BRIEF SUMMARY OF THE INVENTION

A method and apparatus for performing N bit by 2*N (or 2*N−1) bit signed multiplication using two N bit multiply instructions is described. According to one aspect of the invention, a method for performing signed multiplication of A times B (where B has N bits and A has N*2 bits) is described. In this method, $A_{high}$ and $A_{low}$ respectively represent the most and least significant halves of A. According to this method, $A_{low}$ is logically shifted right by one bit to generate $A_{low} >> 1$. Then, $A_{low} >> 1$ is multiplied by B using signed multiplication to generate a first partial result. In addition, a second partial result is generated by performing signed multiplication of $A_{high}$ times B. One or both of the first and second partial results is shifted to align the first and second partial results for addition, and then the addition is performed to generate a final result representing A multiplied by B.

According to another aspect of the invention, a method and apparatus for performing N bit by 2*N (or 2*N−1) bit signed multiplication using a particular packed data instruction is described. According to this method and apparatus, signed multiplication of at least a value A0 by a value B0 is performed. The value A0 and B0 are respectively represented in N and 2*N bits. In response to executing the particular instruction, the following is performed: 1) a first and second set of two data elements are read as part of a first set of two packed operands, wherein one data element in the first set of two data elements is zero, wherein one data element in the second set of two data elements represents B0, and wherein another data element in the second set of two data elements represents one of a most and least significant part of A0; 2) data elements in each of the first and second sets of two data elements are multiplied together to generate a pair of results; and 3) the pair of results are summed to generate a packed operand having a data element representing B0 multiplied by the one of the most and the least significant part of A0 found in the second set of two data elements. The packed operand is generated for use in generating B0 multiplied by A0.

BRIEF DESCRIPTION OF THE DRAWINGS

The invention may best be understood by referring to the following description and accompanying drawings which illustrate the invention. In the drawings.

DETAILED DESCRIPTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

I. Overview

According to one aspect of the invention, a method and apparatus for performing N bit by 2*N−1 bit signed multiplication using two N bit signed multiply instructions is described. According to another aspect of the invention, a method and apparatus for performing N bit by 2*N (or 2*N−1) bit signed multiplication using packed data operations is described. Any method described herein can be used for multiplying integer and/or floating point numbers.

II. Exemplary Computer System

Figure 2:
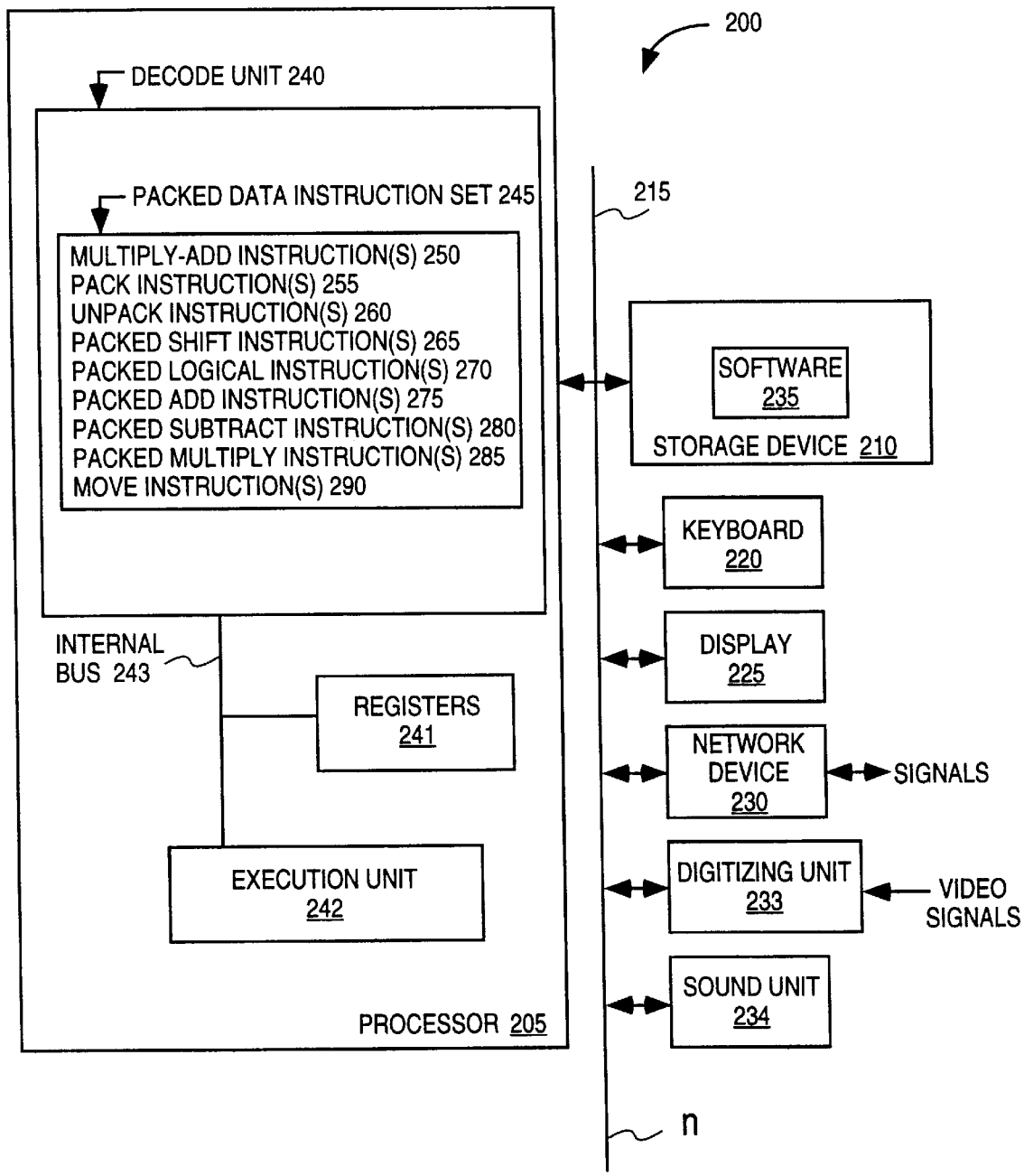
FIG. 2 shows a block diagram illustrating an exemplary computer system 200 according to one embodiment of the invention.

FIG. 2 shows a block diagram illustrating an exemplary computer system 200 according to one embodiment of the invention. The exemplary computer system 200 includes a processor 205, a storage device 210, and a bus 215. The processor 205 is coupled to the storage device 210 by the bus 215. In addition, a number of user input/output devices, such as a keyboard 220 and a display 225, are also coupled to the bus 215. The processor 205 represents a central processing unit of any type of architecture, such as a CISC, RISC, VLIW, or hybrid architecture. In addition, the processor 205 could be implemented on one or more chips. The storage device 210 represents one or more mechanisms for storing data. For example, the storage device 210 may include read only memory (ROM), random access memory (RAM), magnetic disk storage mediums, optical storage mediums, flash memory devices, and/or other machine-readable mediums. The bus 215 represents one or more busses (e.g., PCI, ISA, X-Bus, EISA, VESA, etc.) and bridges (also termed as bus controllers). While this embodiment is described in relation to a single processor computer system, the invention could be implemented in a multi-processor computer system.

In addition to other devices, one or more of a network device 230, a digitizing unit 233, and a sound unit 234 may optionally be coupled to bus 215. The network device 230 represents one or more network connections (e.g., an ethernet connection, a fax/modem, etc.) for receiving signals (e.g., carrier waves). The term machine readable medium as used herein also includes signals received from a network, including carrier waves. The digitizing unit 233 represents one or more devices for digitizing images (e.g., a scanner, a camera, etc.). The sound unit 234 represents one or more devices for inputting and/or outputting sound (e.g., microphones, speakers, magnetic storage devices, optical storage devices, etc.)

FIG. 2 also illustrates that the storage device 210 has stored therein software 235. The software 235 represents the necessary code for performing any and/or all of the techniques described with reference to FIGS. 3, 10, 11, and 12. Of course, the storage device 210 preferably contains additional software (not shown), which is not necessary to understanding the invention.

FIG. 2 also illustrates that the processor 205 includes a decode unit 240, a set of registers 241, an execution unit 242, and an internal bus 243 for executing instructions. Of course, the processor 205 contains additional circuitry, which is not necessary to understanding the invention. The decode unit 240, registers 241 and execution unit 242 are coupled together by internal bus 243. The decode unit 240 is used for decoding instructions received by processor 205 into control signals and/or microcode entry points. In response to these conrol signals and/or microcode entry points, the execution unit 242 performs the appropriate operations. The decode unit 240 may be implemented using any number of different mechanisms (e.g., a look-up table, a hardware implementation, a PLA, etc.).

The processor 205 can include new instructions and/or instructions similar to or the same as those found in existing general purpose processors. For example, in one embodiment the processor 205 supports an instruction set which is compatible with the Intel Architecture instruction set used by existing processors, such as the Pentium® processor. The registers 241 represent a storage area on processor 205 for storing information, including data and control/status information.

Figure 3:
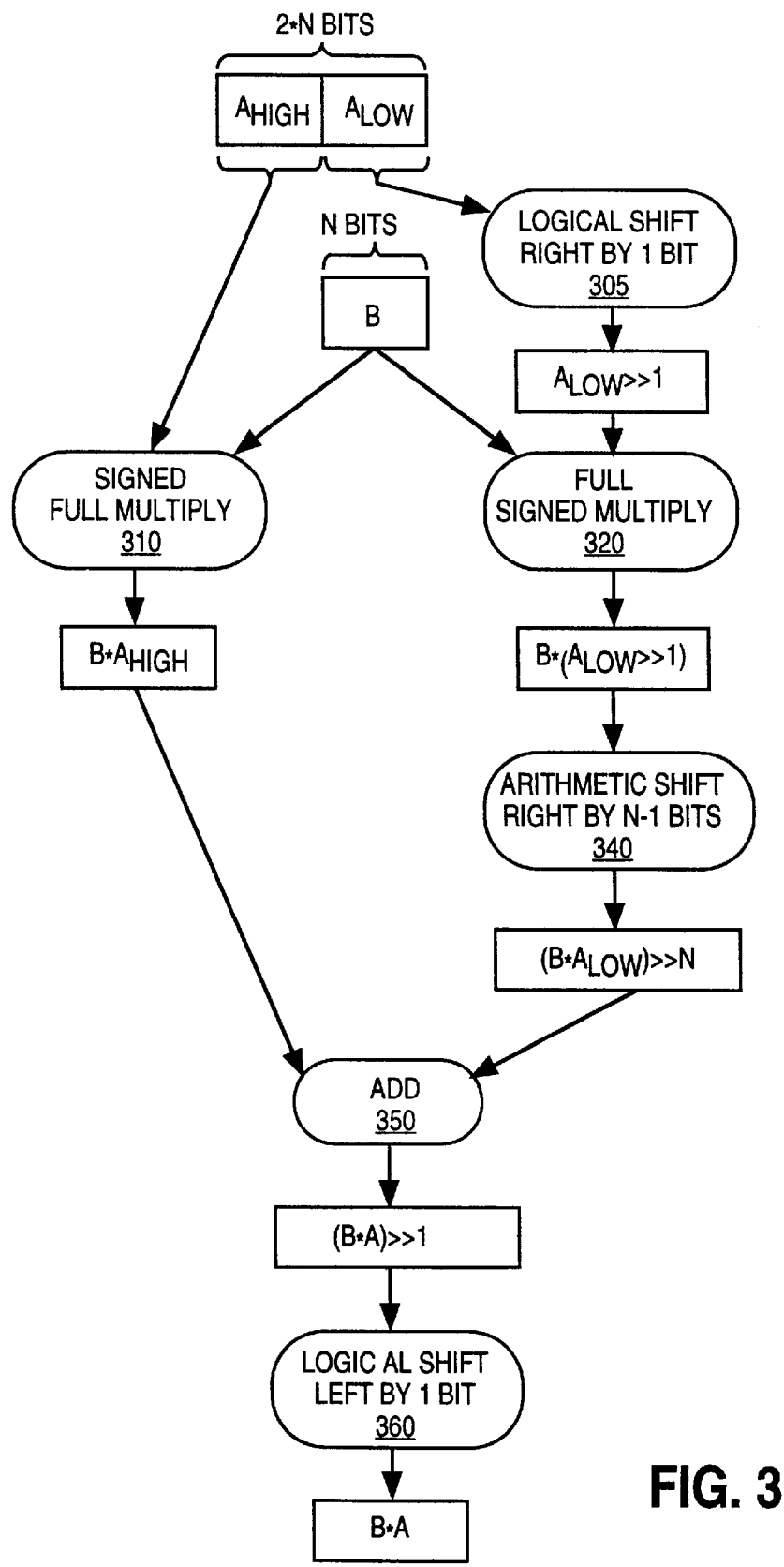
FIG. 3 is a data flow diagram illustrating a method of using two N bit by N bit signed multiply operations to perform an N bit by 2*N−1 bit signed multiplication according to one embodiment of the invention.

III. N bit by 2*N−1 Bit Multiplication Using Two N bit by N bit Scalar Multiplies FIG. 3 is a data flow diagram illustrating a method of using two N bit by N bit signed multiply operations to perform a signed N bit by 2*N−1 bit multiplication according to one embodiment of the invention. In FIG. 3, rectangles are used to illustrate data and ovals are used to illustrate operations. FIG. 3 shows a value A represented in $2*N$ bits and a value B represented in N bits. The value A is divided into a most significant half ($A_{HIGH}$) and a least significant half ($A_{LOW}$).

Figure 1:
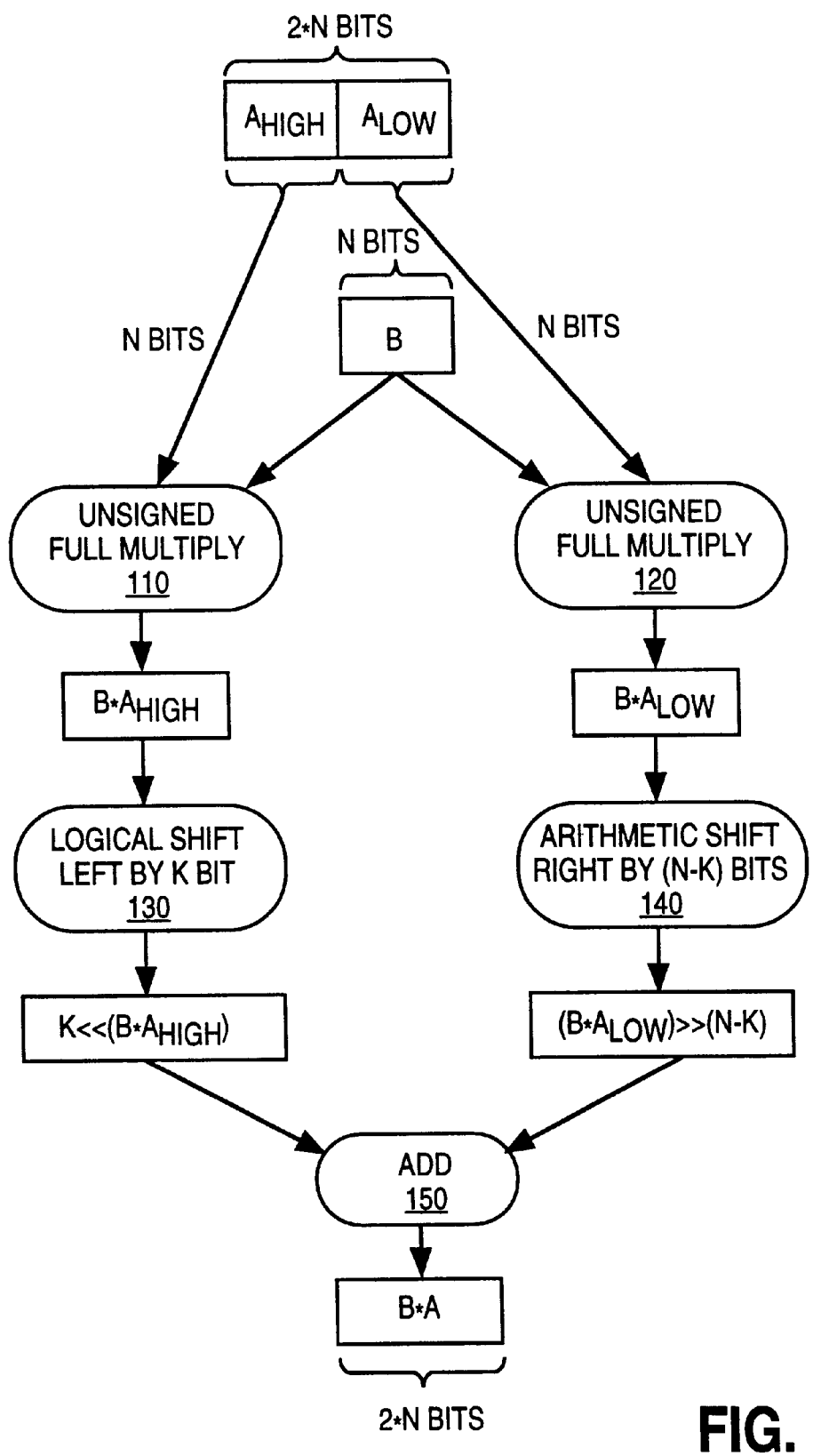
FIG. 1 is a data flow diagram illustrating a method of using two N bit by N bit multiply operations to perform an unsigned N bit by 2*N bit multiply operation.

Since B is a signed value and $A_{LOW}$ is an unsigned value, unsigned multiplication cannot be used to multiply $A_{LOW}$ by B (In step 120 of FIG. 1, both $A_{LOW}$ and B were unsigned values that could be multiplied together using an unsigned multiply operation). In order to use a signed multiply operation, $A_{LOW}$ is logically shifted right by 1 bit to generate $A_{LOW}>>1$ (Step 305). The logical shift right operation places a 0 into the most significant bit position of $A_{LOW}>>$. Since the sign bit of $A_{LOW}>>1$ is zero, the result of a signed multiply operation is the same as the result of an unsigned multiply operation. In steps 310 and 320, $A_{HIGH}$ and $A_{LOW}>>1$ are each multiplied by B using signed multiplication to respectively generate $B*A_{HIGH}$ and $B*(A_{LOW}>>1)$.

Thus, one way that the methods illustrated in FIGS. 3 and 1 differ is that the method of FIG. 3 uses two signed multiply operations (steps 310 and 320), while the method of FIG. 1 uses two unsigned multiply operations (steps 110 and 120).

As with the method of FIG. 1, adding $B*A_{HIGH}$ and $B*(A_{LOW}>>1)$ in the properly aligned manner yields $B*A$. FIG. 1 and Table 1 illustrate that different windows of $2*N$ bits can be selected from the $3*N$ bits based on the manner in which the values are aligned for the addition operation. While any technique of properly aligning the values for the addition is within the scope of the invention, FIG. 3 illustrates one way of properly aligning the values for the addition operation. In step 340, $B*(A_{LOW}>>1)$ is arithmetically shifted right (N−1) bits to generate $(B*A_{LOW})>>N$. In step 350, $B*A_{HIGH}$ and $(B*A_{LOW})>>N$ are added to generate $2*N$ bits out of the $3*N$ bits representing $(B*A)>>1$. In step 360, $(B*A)>>1$ is logically shifted left 1 bit to generate $B*A$. While any number of bits may be used, $B*A_{HIGH}$, $B*(A_{LOW}>>1)$, $(B*A_{LOW})>>N$, $(B*A)>>1$ and the result representing $B*A$ each contain $2*N$ bits in one embodiment of the invention.

Thus, another way in which the methods of FIGS. 1 and 3 differ is that the shift operation of step 130 is placed after the add operation (step 360 follows step 350). The logical shift left is placed after the add operation because the logical shift left can be avoided in many routines (e.g., vector and matrix multiplications, convolution operations, etc.) where many multiplication results are added together to produce a final result. When such a final result is being generated, all intermediate calculations may be performed on the unshifted values (e.g., $(B*A)>>1$) and a single logical shift left by 1 bit may be performed on the final result.

As previously stated, different embodiments of the invention can perform any number of different shifting operations to properly align the values for the addition. For example, alternative embodiments may use the method shown in FIG. 1 (e.g., step 360 is changed to a logical shift left by K bits and is moved to after the signed multiply (310) and before the add (step 350); and step 340 is increased from an (N−1) bit shift to an (N−K−1) bit shift. In another embodiment, the steps 340 and 360 are replaced with a logical shift left by (N−1) bits operation on $B*A_{HIGH}$ between steps 310 and 350.

IV. Exemplary Packed Implementation

Multimedia applications (e.g., applications targeted at the integration of teleconferencing with mixed media data manipulation, 2D/3D graphics, image processing, video compression/decompression, recognition algorithms, and audio manipulation, etc.) require the manipulation of large amounts of data which may be represented in a small number of bits. For example, graphical data typically requires 24 bits in three groups of 8, and sound data typically requires 8 bits.

To improve the processing efficiency of multimedia applications (as well as other applications that have the same characteristics), the processor 205 supports packed data formats. A packed data format is one in which the bits typically used to represent a single scalar value are divided into a number of fixed sized data elements, each of which represents a separate value. For example, a 64-bit register may be divided into two 32-bit elements, each of which represents a separate 32-bit value.

The processor 205 supports instructions (referred to as packed data instructions or SIMD (single instruction multiple data) instructions) for separately manipulating each data element in the packed data types in parallel. For example, a packed add instruction adds together corresponding data elements from a first packed operand and a second packed operand.

A. Exemplar Packed Data Instructions

In FIG. 2, the decode unit 240 is shown including an exemplary packed data instruction set 245 for performing operations on packed data. In one embodiment, the packed data instruction set 245 includes the following instructions: a packed multiply-add instruction(s) (PMADD) 250, a pack instruction(s) (PACK) 255, an unpack/interleave instruction(s) (PUNPCK) 260, a packed shift instruction(s) 265, a set of packed logical instruction(s) 270, a packed add instruction(s) (PADD) 275, a packed subtract instruction(s) (PSUB) 280, a packed multiply instruction(s) (PMUL) 285, and a move instruction(s) 290. While these packed data instructions can be implemented to perform any number of different operations, the operation of each of these instructions according one embodiment of the invention is further described later herein. Alternative embodiments of the invention may contain more or less, as well as different, packed data instructions and still utilize the teachings of the invention.

In one embodiment of the invention, the processor 205, executing the packed data instructions, can operate on packed data in several different packed data formats, including: a "packed byte" format (e.g., PADDb), a "packed word" format (e.g., PADDw), a "packed double word" (dword) format (e.g., PADDd); or a "packed quad word" (qword) format (e.g., PADDq). The packed byte format includes eight separate 8-bit data elements; the packed word format includes four separate 16-bit data elements; the packed dword format includes two separate 32-bit data elements; and the packed quad word format includes one 64-bit data element.

While certain instructions are discussed below with reference to one or two packed data formats, the instructions may be similarly applied to other packed data formats. Additionally, many of the instructions of packed data instruction set 245 can operate on signed or unsigned data and can be performed with or without "saturation." If an operation is performed using saturation, the value of the data element is clamped to a predetermined maximum or minimum value when the result of the operation exceeds the range of the data element (referred to as data overflow or underflow). If the operation is performed without saturation, the data may be truncated or may indicate a data overflow or underflow in another manner.

Multiply-Add Instruction(s)

Figure 4A:
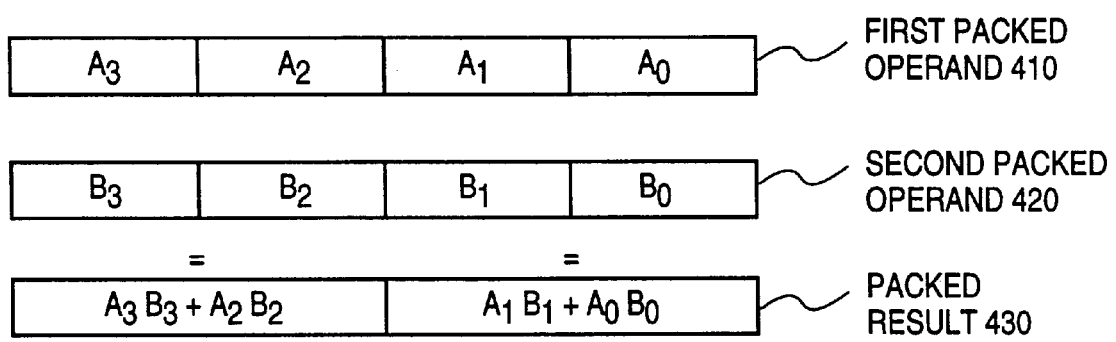
FIG. 4A shows the operation of a multiply-add instruction on two packed operands according to one embodiment of the invention.

FIG. 4A shows, in a simplified format, the operation of a multiply-add instruction on a first packed operand 410 and a second packed operand 420 according to one embodiment of the invention. The term operand is interchangeably used herein to refer to the data on which an instruction operates or the storage area (e.g., register, memory location, etc.) in which that data can be found.

The first packed operand 410 contains the values $A_3$, $A_2$, $A_1$, and $A_0$ as its data elements, while the second packed operand 420 contains the values $B_3$, $B_2$, $B_1$, and $B_0$ as it data elements. The described embodiment of the multiply-add instruction multiplies together corresponding data elements of the first and second packed operands to generate four intermediate results (e.g., $A_3B_3$, $A_2B_2$, $A_1B_1$, and $A_0B_0$). These intermediate results are summed by pairs producing two results (e.g., $A_3B_3+A_2B_2$ and $A_1B_1+A_0B_0$) that are packed into their respective data elements of a packed result 430. Thus, the packed result 430 has a first data element storing $A_3B_3+A_2B_2$ and a second data element storing $A_1B_1+A_0B_0$. In summary, the described embodiment of the multiply-add instruction performs, in parallel, two "multiply-add operations." In one embodiment, each data element of the first and second operands contains 16-bits, while each intermediate result and each data element in the packed result 430 contains 32-bits. This increase in the number of bits allows for increased precision.

Figure 4B:
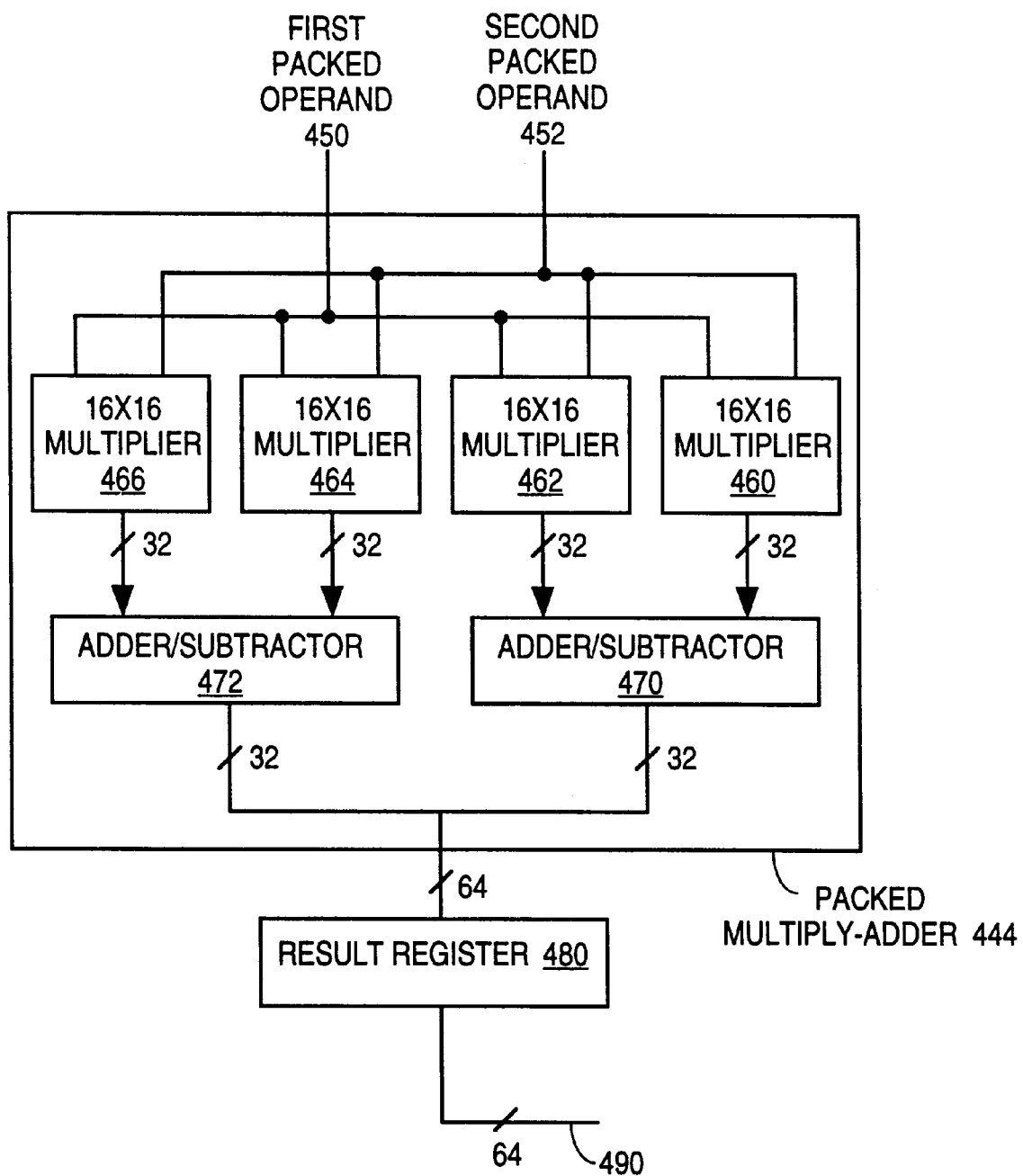
FIG. 4B illustrates a circuit for implementing the multiply-add instruction according to one embodiment of the invention.

FIG. 4B illustrates a circuit for implementing the multiply-add instruction according to one embodiment of the invention. FIG. 4B shows a packed multiply-adder 444 having four 16×16 bit multiplier circuits: a first multiplier 460, a second multiplier 462, a third multiplier 464 and a fourth multiplier 466. In response to executing a multiply-add instruction, the packed multiply-adder 444 receives a first packed operand 450 having bits [63:0] and a second packed operand 452 having bits [63:0].

The corresponding data elements of the first and second packed operands are paired and each provided to a different one of the multipliers (i.e., bits [63:48], [47:32], [31:16], and [15:0] of the first and second operands are respectively provided to the first, second, third, and fourth multipliers). The 32-bit intermediate results generated by the first multiplier 460 and the second multiplier 462 are received by a first adder 470, while the 32-bit intermediate results generated by the third multiplier 464 and the fourth multiplier 466 are received by a second adder 472.

The adders add their respective 32-bit inputs. In one embodiment, these adders are composed of four 8-bit adders with the appropriate propagation delays. However, alternative embodiments could implement these adders in any number of ways (e.g., two 32-bit adders). The output of the first adder 470 (i.e., bits [31:0] of the packed result) and the output of the second adder 472 (i.e., bits [63:32] of the packed result) are combined into the 64-bit packed result and communicated to a result register 480. The result is then communicated out a result bus 490 for storage in memory or the appropriate one of registers 241.

While one circuit implementation of the multiply-add instruction has been provided, alternative embodiments could implement this instruction in any number of ways. For example, alternative embodiments could use different sized multipliers (e.g., 8×16, 8×8) and include the additional adder circuitry to perform the necessary passes through the multipliers. As another example, alternative embodiments could include circuitry capable of doing only one multiply-add operation at a time. In such embodiments, the two multiply-add operations would have to be performed serially.

In place of or in addition to the multiply-add instruction, alternative embodiments can support: 1) a multiply-subtract instruction that performs subtract operations in place of the add operations; and/or 2) a mixed multiply-add/subtract instruction that performs one or more multiply-add operations and one or more multiply-subtract operations. As another example, alternative embodiments may include an instruction which performs multiply-add operation(s) and/or multiply-subtract operation(s) in combination with some other operation. For a further description of embodiments of multiply-add/subtract instructions, see application Ser. No. 522,067, titled "A Method for Performing Multiply-Add Operations on Packed Data," filed Aug. 31, 1995, by Peleg et. al; and application Ser. No. 606,212, titled "An Apparatus for Performing Multiply-Add Operations on Packed Data," filed Feb. 23, 1996, by Peleg et. al.

Pack Instruction(s)

Figure 5:
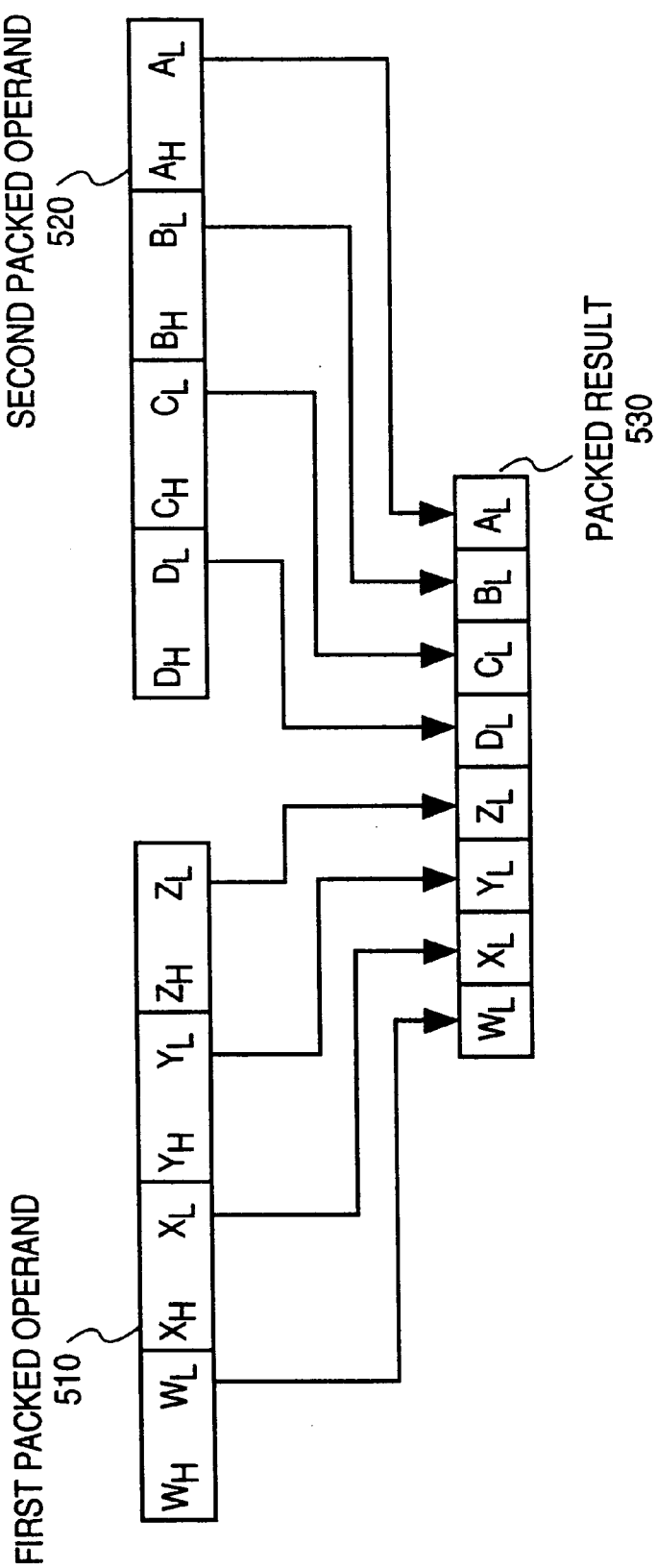
FIG. 5 illustrates the operation of the pack instruction according to one embodiment of the invention.

FIG. 5 illustrates the operation of the pack instruction according to one embodiment of the invention. In this example, the pack instruction converts data from packed words into packed bytes—the pack word instruction (PACKSSw). While, the low-order byte of each packed word data element in a first packed operand 510 is packed into the low-order bytes of a packed result 530, the low-order byte of each packed word data element in a second packed operand 520 is packed into the high-order bytes of the packed result 530. In place of or in addition to the pack instruction that selects the low-order bytes of the source packed operands, an alternative embodiment can support a pack instruction that selects the high-order bytes of each data element in the first and second packed operands. The instruction PACKSS performs a pack operation with signed saturation.

Unpack Instruction(s)

Figure 6:
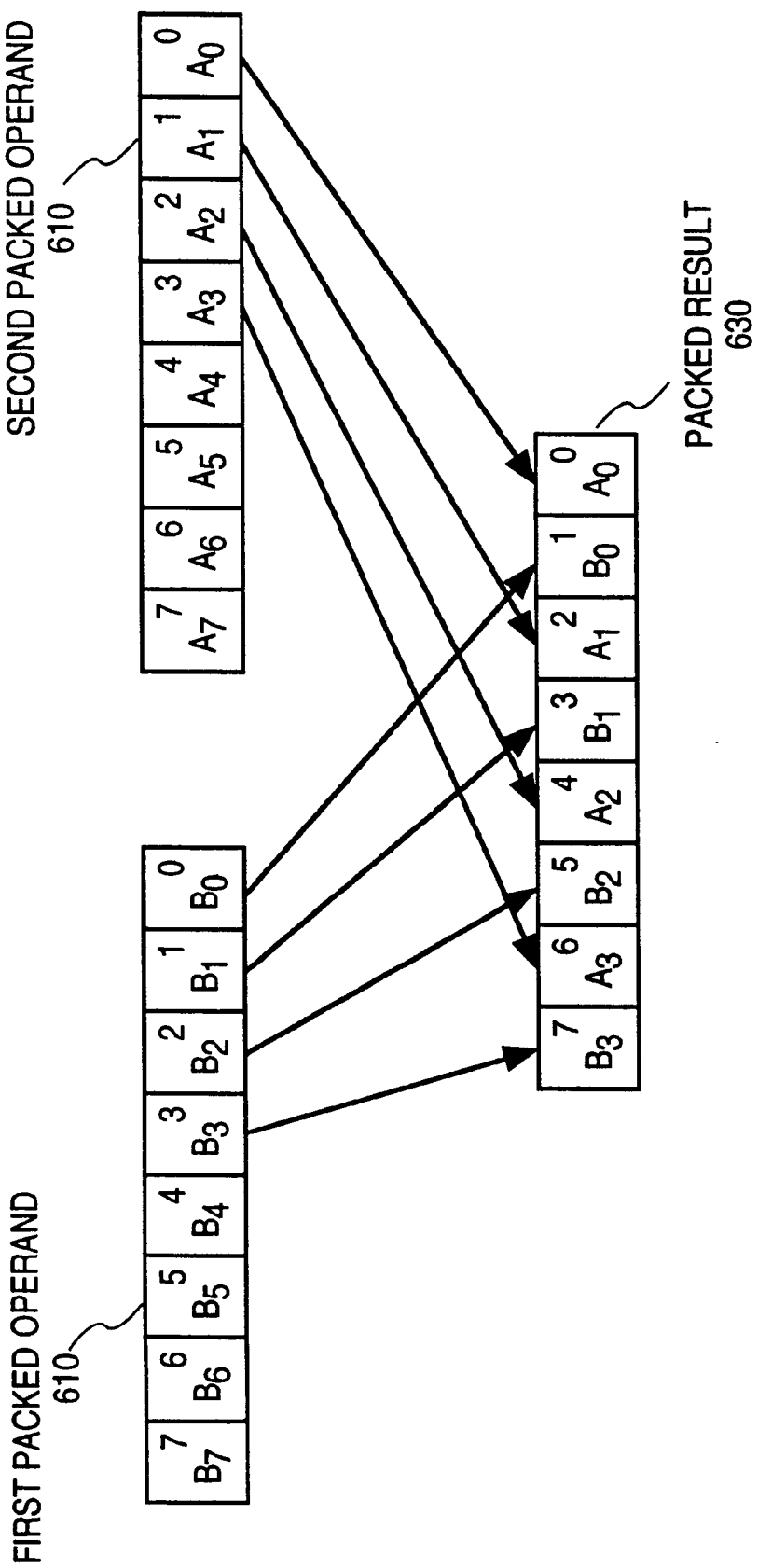
FIG. 6 illustrates the operation of the unpack instruction according to one embodiment of the invention.

FIG. 6 illustrates the operation of the unpack instruction according to one embodiment of the invention. In this example, the unpack instruction interleaves the low-order data elements from a first packed operand 610 and a second packed operand 620. The numbers inside each packed operand identifies the data elements for purposes of illustration. Thus, data element 0 of the first packed operand 610 is stored as data element 0 of a packed result 630. Data element 0 of the second packed operand 620 is stored as data element 1 of the packed result 630. Data element 2 of the first packed operand 610 is stored as data element 2 of the packed result 630 and so forth, until all data elements of the packed result 630 store data elements from either the first or second packed operand. The high-order data elements of both the first and second packed operands are ignored.

By choosing either the first packed operand 610 or the second packed operand 620 to be all zeroes, the unpack may be used to unpack packed byte data elements into packed word data elements, or to unpack packed word data elements into packed dword data elements, etc. In place of or in addition to the unpack instruction that selects the low-order bytes of the source packed operands, an alternative embodiment can support an unpack instruction that interleaves the high-order bytes of each packed operand.

Packed Add and Subtract Instruction(s)

Figure 7:
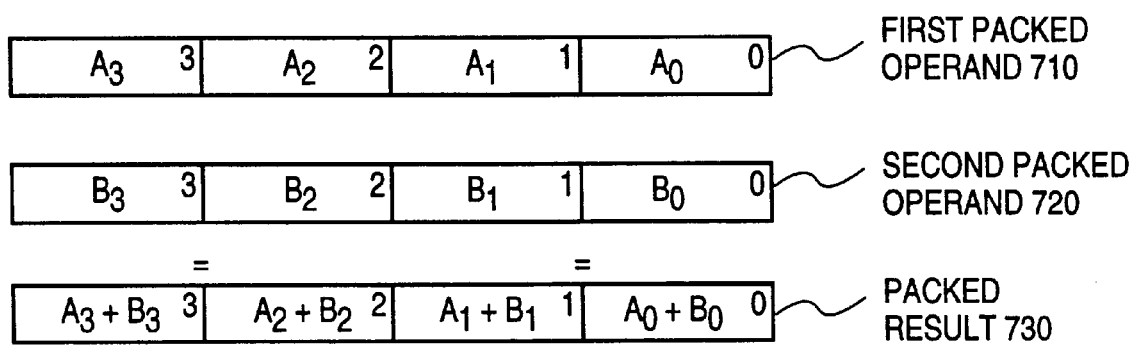
FIG. 7 illustrates the operation of the packed add instruction according to one embodiment of the invention.

FIG. 7 illustrates the operation of the packed add instruction according to one embodiment of the invention. In this example, a packed add word operation (PADDw) is performed. The data elements of a first packed operand 710 are added to the respective data elements of a second packed operand 720 to generate a packed result 730. For example, data element 0 of the first packed operand 710 is added to data element 0 of the second packed operand 720, and the result is stored as data element 0 of the packed result 730. The packed subtract instruction acts in a similar manner to the packed add instruction, except subtractions are performed.

Packed Multiply Instruction(s)

The packed multiply instruction(s) perform signed multiplication of certain of the corresponding data elements in a first and second packed operands to generate a packed result. Assuming that each data element in the first and second packed operands is N bits, the result of each multiplication is stored in a different 2*N bit data element of the packed result.

Figure 8:
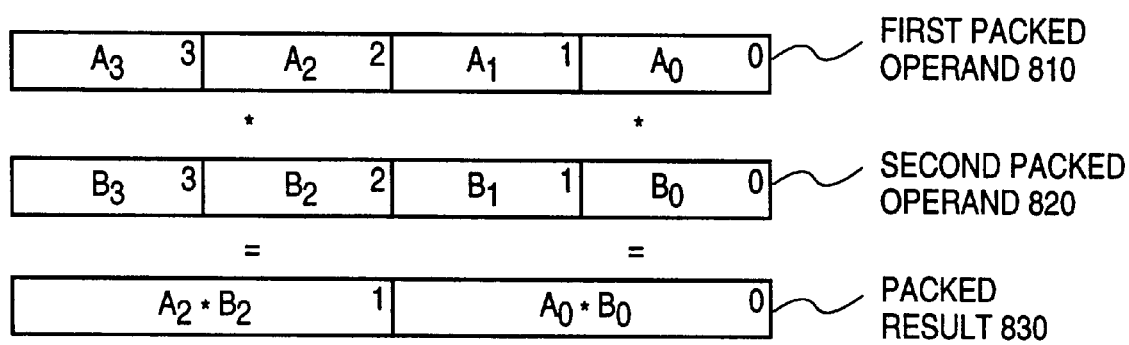
FIG. 8 illustrates a packed multiply word low instruction (PMULlw) according to one embodiment of the invention.

FIG. 8 illustrates a packed multiply word low instruction (PMULlw) according to one embodiment of the invention. FIG. 8 shows a first and second packed operands 910 and 920 each having four 16 bit data elements storing [A3, A2, A1, A0] and [B3, B2, B1, B0], respectively. The data elements 0 and 2 of the first packed operand 910 are multiplied by the respective data elements 0 and 2 of the second packed operand 920 to generate a packed result 930. The packed result 930 has two 32 bit data elements respectively storing [A2*B2, A0*B0]. While one embodiment is described in which every other data element is multiplied, alternative embodiments could select the data elements to be multiplied any number of ways (e.g., using data elements 0 and 1).

In addition to or in place of the packed multiply word low instruction (PMULlw), an embodiment can support a packed multiply word high instruction (PMULhw). If the input packed operands to a PMULhw instruction are [B4, B3, B2, B1] and [A4, A3, A2, A1], the packed result is [B4*A4, B2*A2]. In addition to or in place of the illustrated packed multiply instruction(s) that generate 2*N bit result data elements, alternative embodiments include packed multiply instruction(s) that produce N bit result data elements that selectively contain either the high or low order bits of the 2*N bit multiplication results.

Packed Shift Instruction(s)

One embodiment of the invention includes instructions for arithmetically and/or logically shifting data elements right or left. The shift instruction(s) shift the bits of each individual data element by a specified number of bits in a specified direction.

Figure 9:
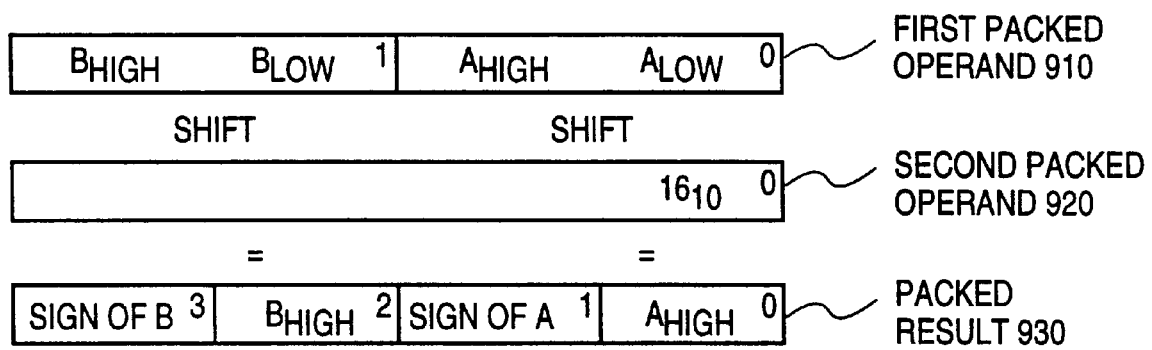
FIG. 9 illustrates a packed shift right arithmetic double word operation (PSRAd) according to one embodiment of the invention.

FIG. 9 illustrates a packed shift right arithmetic double word operation (PSRAd) according to one embodiment of the invention. FIG. 9 shows a first packed operand 910 having two 32-bit data elements representing B ($B_{HIGH}$ and $B_{LOW}$) and A ($A_{HIGH}$ and $A_{LOW}$), respectively. A second packed operand 920 stores an unsigned 64-bit scalar data element indicating the shift count. In FIG. 9, the shift count value is 16 in base 10 notation. Thus, in the example shown in FIG. 9, each data element in the first packed operand 910 is shifted right by 16 bits to generate a packed result 930. Since the shift shown in FIG. 9 is arithmetic, the 16 high-order bits left open by the shift operation are filled with the initial value of the sign bit of the respective data element. In contrast, a logical shift fills the high or low-order bits (depending on the direction of the shift) of the data element with zeroes. Since the shift in the illustration is to the right by 16-bits, the packed result 930 can be logically thought of as having four 16-bit data elements—data element 2 is $B_{HIGH}$ and data element 0 is $A_{HIGH}$. In an alternative embodiment, the second packed operand is a packed operand in which each data element indicates a shift count by which the corresponding data element in the first packed operand 910 is shifted.

Instructions for Logical Operation(s)

Additionally, embodiments may provide several packed logical instructions, such as packed AND, OR, XOR, and ANDNOT instructions which operate in a similar manner on respective data elements from two packed data packed operands to generate data elements in a packed result.

Move Instruction(s)

The move instruction(s) are used for moving data between the data registers used for executing the packed data instructions and both memory and other registers.

Instructions in Alternative Embodiments

For any or all of the above instructions (including the multiply-add instruction), alternative embodiments may vary the number of bits in the packed operands and/or packed results, as well as the number of bits in each data element of the packed operands, packed results, and intermediate results. In addition, alternative embodiments may vary the number of data elements used, the number of intermediate result packed operands generated, and/or the number of data elements in the packed results. For example, while the multiply-add instruction illustrated in FIGS. 4A–B is for 64 bits operands separated into four 16 bit data elements, alternative embodiments could implement additional or different multiply-add instructions. Thus, alternative embodiments could support each instruction with: 1) more or less data elements per source operand; 2) larger or smaller data elements; 3) larger or smaller source packed operands; 4) relative higher or lower precision intermediate and/or fmal results; and/or 5) more or less operations (e.g., more than two multiply-add operations).

The instructions described herein may be implemented to access the first packed operand and/or the second packed operand from registers on the processor or from memory. In addition, these instructions may be implemented to store the packed results in a register on the processor and/or in memory. Furthermore, these instructions may be implemented to overwrite one of the source packed operands with the packed result.

B. N bit by 2*N-1 bit Multiplies Using Two Signed Multiply-Add Instructions

Figure 10:
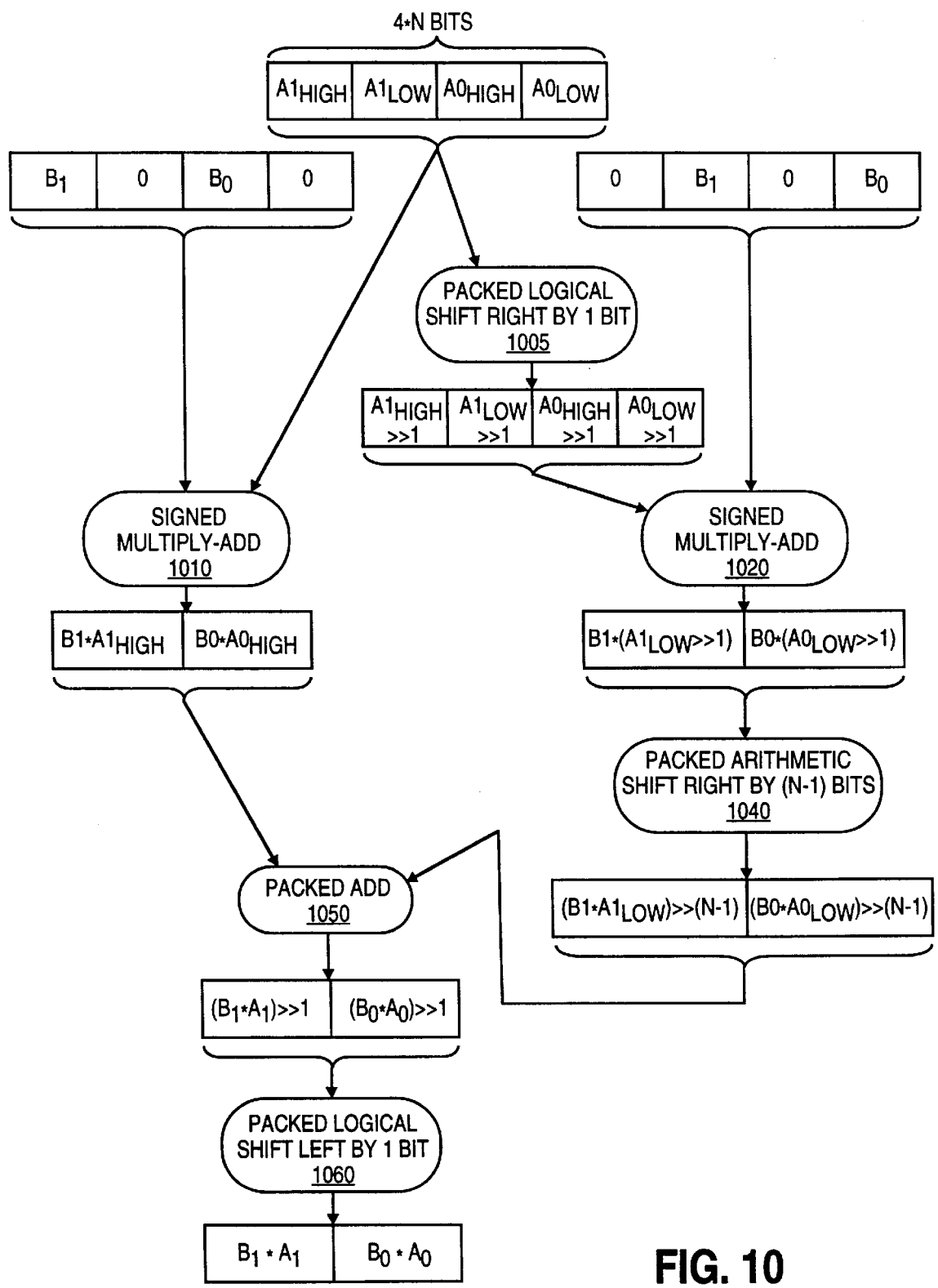
FIG. 10 is a data flow diagram illustrating a method of using two signed multiply-add instructions to perform an N bit by 2*N−1 bit multiply according to one embodiment of the invention.

FIG. 10 is a data flow diagram illustrating a method of using two signed multiply-add instructions to multiply an N bit value by a 2*N bit value according to one embodiment of the invention. In FIG. 10, rectangles are used to illustrate data and ovals are used to illustrate operations.

FIG. 10 shows a first packed operand representing A1 and A0 using four N bit data elements storing [$A1_{HIGH}$, $A1_{LOW}$, $A0_{HIGH}$, and $A0_{LOW}$]. In order to perform the required multiplications using the multiply-add instruction, a second and third packed operands representing B1 and B0 are generated having a unique packed data format. The second and third packed operands each have four N bit data elements respectively storing [B1, 0, B0, 0] and [0, B1, 0, B0]. As shown, the inclusion of the zero in certain data elements results in the multiply-add instruction performing an N bit by N bit multiply to generate a 2*N bit result. Techniques for generating the packed data formats of the second and third operands will be later described with reference to FIG. 11.

In step 1010, a signed multiply-add instruction is executed using the first and second packed operands to perform the operations (B1*$A1_{HIGH}$)+(0*$A1_{LOW}$) and (B0*$A0_{HIGH}$)+(0*$A0_{LOW}$). Since the data elements containing zero cause the multiplications to result in 0, the packed result generated in step 1010 has two data elements respectively representing B1*$A1_{HIGH}$ and B0*$A0_{HIGH}$.

Since $A1_{LOW}$ and $A0_{LOW}$ are unsigned, a signed multiply-add cannot be used to respectively multiply the low-order halves of A1 and A0 by B1 and B0. To allow a signed multiply-add to be used, the shifting technique illustrated in FIG. 3 is used in step 1005. In step 1005, a packed logical shift right by 1 bit is performed on each data element of the first packed operand to generate a packed result storing $[A1_{HIGH}>>1, A1_{LOW}>>1, A0_{HIGH}>>1, A0_{LOW}>>]$.

In step 1020, a signed multiply-add instruction is performed on the packed operand storing $[A1_{HIGH}>>1, A1_{LOW}>>1, A0_{HIGH}>>1, A0_{LOW}>>]$ and the third packed operand storing [0, B1, 0, B0]. Similar to step 1010, the data elements containing zero cause certain multiplications to result in 0, and the packed result generated by step 1020 has two data elements respectively representing B1* $(A1_{LOW}>>1)$ and B0*$(A0_{LOW}>>1)$.

As with the method of FIGS. 1 and 3, adding B*$A_{HIGH}$ and B*$(A_{LOW}>>1)$ in the properly aligned manner yields B*A. As previously described, different windows of 2*N bits can be selected from the 3*N bit result based on the manner in which the values are aligned for the addition operation. Although the method of FIG. 10 is illustrated using the same technique as FIG. 3, the different alternatives described with reference to FIG. 3 are equally applicable to FIG. 10. In step 1040, each data element of the packed operand storing $[b1*(A1_{LOW}>>1), B0*(A0_{LOW}>>1)]$ is arithmetically shifted right (N−1) bits to generate a packed result storing $[(B1*A1_{LOW})>>N, (B0*A0_{LOW})>>N]$. The shifting in step 1040 properly aligns the values for an addition (step 1050) that generates a packed result representing $[(B1*A1)>>1, (B0*A0)>>1]$. In step 1060, $[(B1*A1)>>1, (B0*A0)>>1]$ is logically shifted left 1 bit to generate a packed result representing [B1*A1, B0*A0].

As described with reference to FIG. 3, a number of variations of the method shown in FIG. 10 are possible. For example, while any number of bits may be used, the data elements generated by the multiply-add and add operations each contain 2*N bits in one embodiment of the invention. As another example, the method shown in FIG. 10 places the shift operation of step 1060 after the add operation (step 1050). As previously described, the logical shift left is placed after the add because the logical shift left can be avoided in many routines (e.g., vector and matrix multiplications, convolution operations, etc.) where many multiplication results are added together to produce a final result.

Additionally, while one embodiment is described in which two sets of values are multiplied in parallel, alternative embodiments can multiply together only one set of values—either leaving the remainder of the multiply-add instruction operations unused or using them for another purpose. While one embodiment is described in which two signed multiply-add instructions are used, an alternative embodiment that additionally supports a signed-by-unsigned multiply-add instruction could replace steps 1005 and 1020 with a single signed-by-unsigned multiply-add instruction. While one embodiment is described with reference to values A1, A0, B1 and B0, the invention is not limited to using different values for A1, A0, B1, and B0.

In addition, while one embodiment is described that uses one arrangement of the A and B values in the packed operands, alternative embodiments could use different arrangements. In this regard, all that is necessary is that a zero be appropriately placed in a data element so that the correct multiply operations of the multiply add instruction will generate zero. As a result, any number of different arrangements fall within the scope of the invention. For example, the A1, A0, B1 and B0 values could be placed in packed operands storing $[A1_{HIGH}, 0, A0_{HIGH}, 0], [0, A0_{LOW}, 0, A0_{LOW}]$ and [B1, B1 B0, B0]. Of course, the arrangement that results in the most efficient routine should be used. For example, assuming that each of a larger number of $A_{0...X}$ values must be multiplied by a small set of $B_{0...Y}$ value(s), one embodiment places the set of $B_{0...Y}$ value(s) in the format shown in FIG. 10 and accesses the $A_{0...X}$ values in their native format.

C. Exemplary Techniques for Generating Packed Data Formats

Figure 11:
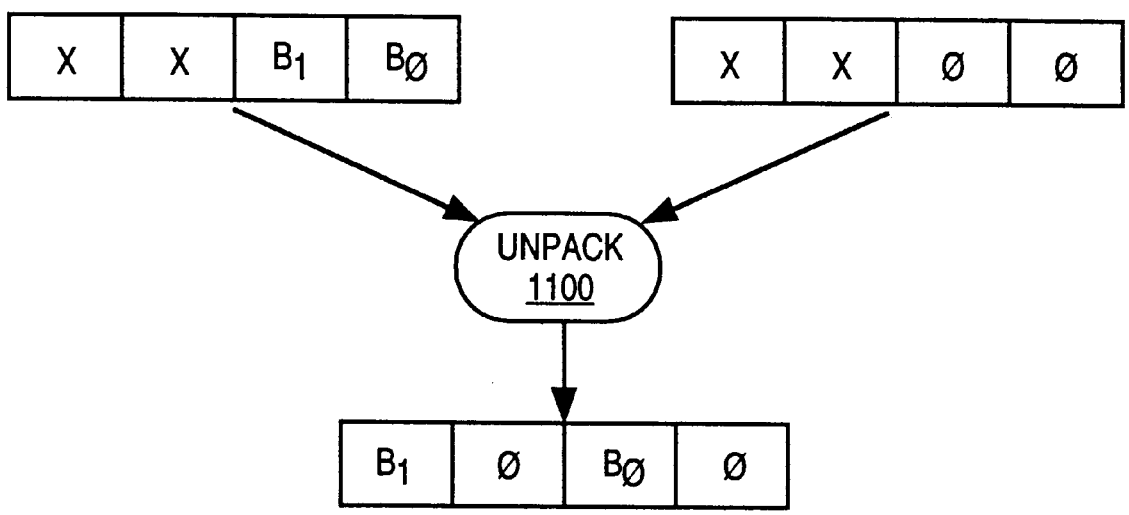
FIG. 11 is a data flow diagram illustrating a method for storing data in the packed operand format [B1, 0, B0, 0] shown in FIG. 10 according to one embodiment of the invention.

FIG. 11 is a data flow diagram illustrating a method for storing data in the packed operand format [B1, 0, B0, 0] shown in FIG. 10 according to one embodiment of the invention. FIG. 11 shows a first packed operand [X, X, B1, B0] and a second packed operand [X, X, 0, 0] (where X represents don't care). In step 1100, an unpack instruction that operates on the low-order halves is executed to generate the result packed operand [B1, 0, B0, 0]. The other packed format [0, B1, 0, B0] shown in FIG. 10 can be generated using an unpack operation with the operands reversed (i.e., the first packed operand is [0,0,0,0] and the second packed operand is [X, X, B1, B0]).

Of course, any number of different methods can be used to generate the required packed operands. For example, an unpack instruction that operates on the high-order halves could be used. As another example, logical and shift operations could be used. Thus, the invention is in no way limited by the method used to place the set of B and/or A value(s) in the necessary packed format to perform the multiply-add operations. In addition, similar techniques may be used to store data in formats amenable to embodiments which include different variations of the multiply-add instruction (e.g., the multiply-subtract instruction).

D. N bit by 2*N−1 bit Multiplication Using Two Packed Signed Multiply Instructions The packed signed multiply instruction(s) that generate 2*N bit result data elements can also be used to implement the method of FIG. 10. When using the packed signed multiply instruction, the steps 1010 and 1020 of FIG. 10 are respectively replaced with packed signed multiply word high (PMULhw) and low (PMULlw) operations. In such an implementation, the source packed operands containing the A1, A0, B1, and B0 values need not have a 0 in certain data elements as required by the multiply-add instruction.

As with the methods of FIGS. 3 and 10, numerous variations are possible. For example, alternative embodiments that support only one of PMULhw or PMULlw must properly shift/arrange the data elements to use the supported multiply operation.

V. Exemplary Uses of the N bit by 2*N bit (or 2*N−1 bit) Multiplication

The invention can be used in any case where a series of multiplications need to be performed between more-accurate numbers and less-accurate numbers, and the invention is most useful in those cases where the less-accurate numbers are reused over several multiplications). In addition, the packed versions of the invention are particularly useful in multimedia applications. While several example uses of N bit by 2*N (or 2*N−1) multiplications are described below (in particular, 16 bit by 32 (or 31) bit multiplication), it is understood that the invention is not limited to these uses.

A. 3D Geometry Transformations

One exemplary use of 16 bit by 32 (or 31) bit multiplications is for generating a rendition of three-dimensional (3D) objects on a two-dimensional (2D) display (e.g., the display 225 of FIG. 2) or other output device. 3D computer graphics can be used for any number of purposes, including computer-aided design, computer games, animation, etc.

3D graphics generally require that 3D geometry transformations be performed to manipulate the displayed objects. Common geometrical transforms include translation (change of position of object(s)), rotation (change of angle of object(s)), scale (change of size of object(s)), shear (linearly dependent change of position of object(s)), etc. For 3D space, each transform has a component in each of the three dimensions (x, y, and z), and can be written as a 4×4 matrix (see Equations 1 and 2).

$$\begin{bmatrix} 1 & 0 & 0 & Tx \\ 0 & 1 & 0 & Ty \\ 0 & 0 & 1 & Tz \\ 0 & 0 & 0 & 1 \end{bmatrix} \begin{bmatrix} Sx & 0 & 0 & 0 \\ 0 & Sy & 0 & 0 \\ 0 & 0 & Sz & 0 \\ 0 & 0 & 0 & 1 \end{bmatrix} \begin{bmatrix} 1 & Hxy & Hxz & 0 \\ Hyx & 1 & Hyz & 0 \\ Hzx & Hzy & 1 & 0 \\ 0 & 0 & 0 & 1 \end{bmatrix}$$

$$\begin{bmatrix} 1 & 0 & 0 & 0 \\ 0 & Cx & Ix & 0 \\ 0 & -Ix & Cx & 0 \\ 0 & 0 & 0 & 1 \end{bmatrix} \begin{bmatrix} Cy & 0 & Iy & 0 \\ 0 & 1 & 0 & 0 \\ -Iy & 0 & Cy & 0 \\ 0 & 0 & 0 & 1 \end{bmatrix} \begin{bmatrix} Cz & Iz & 0 & 0 \\ -Iz & Cz & 0 & 0 \\ 0 & 0 & 1 & 0 \\ 0 & 0 & 0 & 1 \end{bmatrix}$$

Equation 1 represents an exemplary matrix used for translation, scale and shear, while Equation 2 is representative of the matrices used for rotation. The transforms of equations 1 and 2 can be combined into a single 4×4 matrix using Equation 3.

$$T * S * H * Rx * Ry * Rz = M$$

Where Ri represents the rotation about the i axis, and M represents the resulting matrix.

Equation 3

When rendering 3D graphics, relatively large objects are typically modeled using many polygons (e.g., triangles, rectangles, etc.) which are, in turn, defined by their vertices (3D points in the x, y, and z planes). Since an entire object (or group of objects) is transformed by applying a given transform to each of it vertices, it is convenient to represent each vertex is a vector and to write the transform of points in terms of matrix multiplication of vectors (see Equation 4).

$$\begin{bmatrix} \text{Transform} \\ \text{Matrix } (M) \end{bmatrix} \times \begin{bmatrix} \text{Original} \\ \text{Vertices} \\ \text{Vector} \end{bmatrix} = \begin{bmatrix} \text{Transformed} \\ \text{Vertices} \\ \text{Vector} \end{bmatrix} \quad \text{Equation 4}$$

Since the same transform (M) is applied to a large number of vertices, it is efficient to calculate M once (per animation frame, per object, per group of objects, etc.) and then apply its results to the vertices of the object (or group of objects) (see equation 5).

$$M * Voi = Vti$$

Where Voi where Voi is the i-th original vector, and Vti is the i-th transformed vector.

Equation 5

Certain prior art system utilize processor(s)/special circuitry on graphics card(s) to perform 3D geometry transformations. However, using the software 235 executing on the host processor 205, the 3D geometry transformation processing can now be transferred from the graphics card(s) to the host processor 205 of the computer system of FIG. 2. Since the host processor 205 is now performing the 3D geometry transformations, the complexity of the graphics card in the computer system of FIG. 2 is reduced (e.g., additional floating-point hardware on the graphics card for performing the geometry calculations is no longer present).

Figure 12:
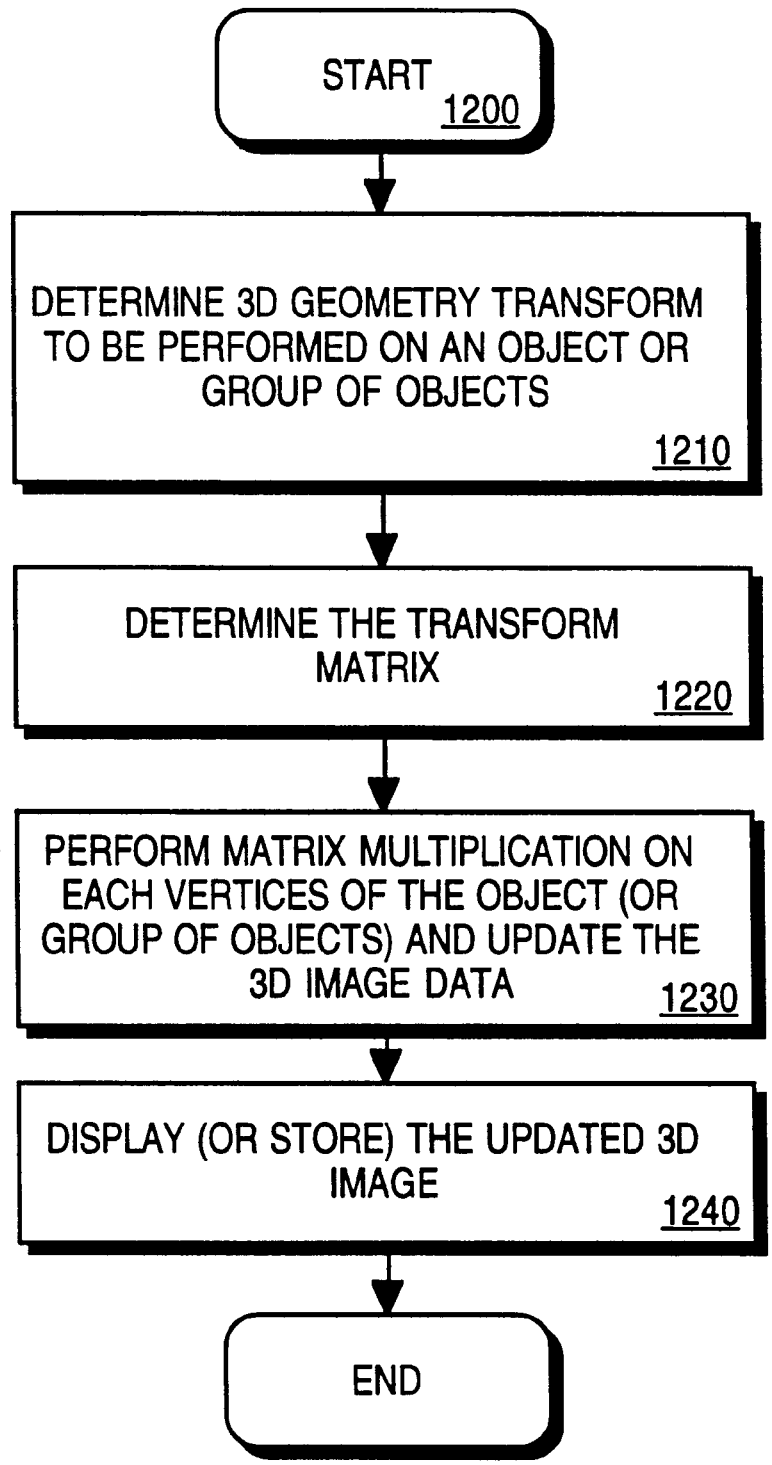
FIG. 12 is a flow diagram illustrating a method for performing 3D geometry transformations on the exemplary computer system of FIG. 2 according to one embodiment of the invention.

FIG. 12 is a flow diagram illustrating a method for performing 3D geometry transformations on the exemplary computer system of FIG. 2 according to one embodiment of the invention. The flow diagram starts at step 1200, from which control passes to step 1210.

In step 1210, the 3D geometry transform to be performed on an object (or group of objects) is determined and control passes to step 1220. In step 1220, the transform matrix (M) is calculated for the determined 3D geometry transform and control passes to step 1230. In one exemplary embodiment, steps 1210 and 1220 are performed by the host processor 205 executing the software 235. In this exemplary embodiment, performing steps 1210 and 1220 generates the elements of the M matrix in the packed format of B (or some similar format) shown in FIG. 10.

As shown in step 1230, the matrix multiplication on each vertex of the object (or group of objects) is performed and the 3D image data is updated. In the exemplary embodiment, the data representing the existing 3D image is provided to the processor 205 in the packed format of A (or some similar format) shown in FIG. 10. The data representing the existing 3D image can be provided to the processor 205 from any machine readable medium, including a CD ROM, over the network device 230, etc. The processor 205, executing the software 235, performs the matrix multiplications using some version of the previously described methods for performing N bit by 2*N bit (or 2*N−1 bit) multiplications (e.g., the method of FIG. 10 to perform 16 by 31 bit multiplications).

From step 1230, control passes to step 1240 where the new 3D image is displayed. In the exemplary embodiment, the resulting data representing the updated 3D image is provided to the graphics card(s), which, in turn, cause the new 3D image to be displayed on the display 225.

B. Signal Processing

The invention is also useful in any type of signal-processing task where a filter is applied to a signal and the coefficients of the filter (which remain the same over many computations) require less accuracy than the signal itself. The signal can include any type of signal, such as audio, video, radio, TV, etc. As an example, audio filtering (e.g., a Finite Impulse Response Filter) is typically performed on audio samples that require 24 bits of accuracy in input and output (more bits will be needed for intermediate calculations to avoid rounding and overflow errors). While accuracy in the audio signal itself (i.e., the audio samples) directly impacts the quality, accuracy in the filter (i.e., the filter coefficients) just causes some loss of fine-tuning accuracy in the filter. As a result, the coefficients of the filter can be represented with 16-bit accuracy. The filter coefficients can be unpacked to the 'B' format and stored in memory in this format prior to applying the filter (with these particular coefficients) to one or more sections of the audio signal. The Finite Impulse Response Filter calculation itself is a convolution (see equation 6).

$$y(n) = \sum_{k=0}^{M-1} c_k \cdot x(n-k) \qquad \text{Equation 6}$$

Where $y()$ are the output samples, $x()$ are the input samples and $c_k$ are the filter coefficients.

In one embodiment, a signal (e.g., audio, video, data, radio, TV, etc.) is received by a device of the computer system 200 (e.g., the network device 230, the digitizing unit 233, the sound unit 234, etc.) and the signal processing requiring the N-bit by 2*N−1 bit multiplications is performed by the processor 205 executing software stored in storage device 210. In such an embodiment, the device receiving the signal can be less complex because it need not contain the hardware/software to perform this and/or other parts of the required signal processing. In this embodiment, the processed signal is then manipulated by the computer system 200 as instructed by the user (e.g., audio signals are sent to the sound unit 234 for playback to the user, video signals are sent to the display 255 for display, etc.).

C. Encryption and Decryption

An additional use of the invention is encryption and decryption. Encryption and decryption can be used for any number of applications, including the encrypting of data for transmission over a network and the decrypting of data received over a network. In particular, the computer system 200 could perform N-bit by 2*N−1 bit multiplications as part of an encryption or decryption program executing on the processor 205 in the computer system 200. As an example, the data being encrypted or decrypted could be sent or received by the network device 230. Again, the hardware/software complexity of the network device 230 is reduced in this computer system.

VI. Alternative Embodiments

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A computer implemented method for performing signed multiplication of at least a value of A0 by a value B0, the method comprising the following intermediate acts performed in response to executing a single instruction:

reading a first and second set of two data elements as part of a first set of two packed operands, wherein one data element in the first set of two data elements is zero, wherein one data element in the second set of two data elements represents B0, wherein B0 is represented in N bits, and wherein one data clement in the second set of two data elements represents one of a most and least significant part of A0, wherein A0 is represented in 2*N bits;

multiplying together data elements in each of the first and second sets of two data elements to generate a first pair of results; and summing the first pair of results to generate a first packed operand having a first data element representing B0 multiplied by the one of the most and the least significant part of A0 found in the second set of two data elements, said first packed operand for use in generating B0 multiplied by A0.

2. The method of claim 1, wherein said reading the first and second set of two data elements as part of the first set of two packed operands includes reading said second set of two data elements, wherein one data element in the second set of two data elements represents the least significant part of A0, and wherein the least significant part of A0 is the least significant half of A0 logically shifted right by 1 bit.

3. The method of claim 1, further comprising:

reading a third and fourth set of two data elements as part of said first set of two packed operands, wherein one data element in the third set of two data elements is zero, wherein one data element in the fourth set of two data elements represents B1, and wherein one data element in the fourth set of two data elements represents one of a most and least significant part of A1;

multiplying together data elements in each of the third and fourth set of two data elements to generate a second pair of results; and summing the second pair of results to generate as part of said first packed operand a second data element representing B1 multiplied by the one of the most and least significant parts of A1.

4. The method of claim 1, wherein said reading said first and second set of two data elements as part of the first set of two packed operands includes:

reading one of said first set of two packed operands that contains data elements respectively representing zero and B0; and reading the other of said first set of two packed operands that contains data elements respectively representing the most significant part of A0 and the least significant part of A0.

5. The method of claim 1, wherein each data element in the first packed operand contains 2*N bits.

6. A computer implemented method for performing signed multiplication of at least a value A0 by a value B0, the method comprising:

in response to executing a first single instruction, reading a first and second set of two data elements as part of a first set of two packed operands, wherein one data element in the first set of two data elements is zero, wherein one data element in the second set of two data elements represents B0, wherein B0 is represented in N bits, and wherein one data element in the second set of two data elements represents one of a most and least significant part of A0, wherein A0 is represented in N*2 bits;

multiplying together data elements in each of the first and second set of two data elements to generate a first pair of results; and summing the first pair of results to generate a first packed operand having a first data element representing B0 multiplied by one of the most and least significant parts of A0;

forming a second packed operand having a first data element representing B0 multiplied by the other of the most and least significant parts of A0;

shifting each data element in one or both of the first and second packed operands to align data elements in the first and second packed operands for addition; and adding corresponding data elements form the first and second packed operands to generate a final packed operand having a data element representing A0 multiplied by B0.

7. The method of claim 6, wherein:

the first data element of the first packed operand represents B0 multiplied by the least significant part of A0; and said method further comprises, logically shifting the least significant half of A0 to right by 1 bit to generate the data element in the first set of two data elements representing the least significant part of A0.

8. The method of claim 6, wherein said shifting each data element in one or both of the first and second packed operands to align data elements in the first and second packed operands for addition comprises:

arithmetically shifting each data element in the second packed operand right N−2 bits; and logically shifting each data element in the first packed operand left by 1 bit.

9. The method of claim 6, wherein said shifting each data element in one or both of the first and second packed operands to align data elements in the first and second packed operands for addition comprises:

arithmetically shifting each data element in the second packed operand right by N−1 bits.

10. The method of claim 9 further comprising:

logically shifting each data element in the final packed operand left by 1 bit.

11. The method of claim 6, wherein:

in response to executing said first single instruction, reading a third and fourth set of two data elements as part of said first set of two packed operands, wherein one data element in the third set of two data elements is zero, wherein one data element in the fourth set of two data elements represents B1, and wherein one data element in the fourth set of two data elements represents one of a most and least significant part of A1;

multiplying together data elements in each of the third and fourth set of two data elements to generate a second pair of results; and summing the second pair of results to generate as part of said first packed operand a second data element representing B1 multiplied by one of the most and least significant parts of A1; and fonning as part of said second packed operand a second data element representing B1 multiplied by the other of the most and least significant parts of A1; and said adding corresponding data elements from the first and second packed operands also generates as part of the final packed operand a second data element representing A1 multiplied by B1.

12. The method of claim 6, wherein said reading said first and second set of two data elements as part of the first set of two packed operands includes:

reading one of said first set of two packed operands that contains data elements respectively representing zero and B0; and reading the other of said first set of two packed operands that contains data elements respectively representing a most significant part of A0 and the least significant part of A0.

13. The method of claim 6, wherein each data element in the first, second and final packed operands contains 2*N bits.

14. The method of claim 13, wherein said forming includes:

in response to executing a second single instruction, reading a third and fourth set of two data elements as part of a second set of two packed operands, wherein one data element in the third set of two data elements is zero, and wherein data elements in the fourth set of two data elements respectively represent B0 and the most significant part of A0;

multiplying together data elements in each of the third and fourth set of two data elements to generate a second pair of results; and summing the second pair of results 0 generate the first data element in the second packed operand.

* * * * *

UNITED STATES PATENT AND TRADEMARK OFFICE
CERTIFICATE OF CORRECTION

PATENT NO.   : 6,370,559 B1
DATED        : April 9, 2002
INVENTOR(S)  : Hoffman

It is certified that error appears in the above-identified patent and that said Letters Patent is hereby corrected as shown below:

Column 2,
Line 54, delete "set", insert -- sets --.

Column 10,
Line 28, delete "fmal", insert -- final --.

Column 11,
Line 6, delete "$AO_{LOW}>>$", insert -- $AO_{LOW}>>1$ --.
Line 9, delete "$AO_{LOW}>>$", insert -- $AO_{LOW}>>1$ --.

Column 12,
Line 2, after "B1", insert -- , --.

Column 13,
Line 21, insert -- Where Ti is the translation along the i axis, Si is the scaling along i axis, and Hij is the dependence of the I axis on the j axis.
Equation 1 --.
Line 28, insert -- Where Ci is the cos(angle) for the i axis, and Ii is the sin(angle) for the i axis.
Equation 2 --.

Column 18,
Line 3, delete "fonning", insert -- forming --.

Signed and Sealed this

Fifth Day of November, 2002

Attest:

JAMES E. ROGAN
Attesting Officer    Director of the United States Patent and Trademark Office